(12) United States Patent  
Salman

(10) Patent No.: US 8,239,365 B2  
(45) Date of Patent: *Aug. 7, 2012

(54) FLEXIBLE REQUEST AND RESPONSE COMMUNICATIONS INTERFACES

(76) Inventor: Mohammad Salman, Newark, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/841,999

(22) Filed: Jul. 22, 2010

(65) Prior Publication Data

US 2010/0287198 A1 Nov. 11, 2010

Related U.S. Application Data

(63) Continuation of application No. 11/833,867, filed on Aug. 3, 2007, now Pat. No. 7,788,250.

(60) Provisional application No. 60/821,516, filed on Aug. 4, 2006.

(51) Int. Cl.  
*G06F 7/00* (2006.01)

(52) U.S. Cl. .................................................. 707/706
(58) Field of Classification Search ............... 707/607
See application file for complete search history.

(56) References Cited

U.S. PATENT DOCUMENTS

2007/0011081 A1* 1/2007 Bok et al. ..................... 705/37
2007/0073605 A1* 3/2007 Kohavi et al. ................ 705/37
2007/0124216 A1* 5/2007 Lucas ........................... 705/27

* cited by examiner

*Primary Examiner* — Truong Vo  
(74) *Attorney, Agent, or Firm* — Lewis and Roca LLP

(57) ABSTRACT

Methods and systems for database storage allowing subscriber entities to create specialized interfaces for storing different classes of information based on subscribed-defined categories and parameters, allowing for efficient search and retrieval of the information by users using the subscriber-defined categories and parameters. The present technology allows users, such as suppliers, administrators, and others, to add inventory to a database through an interface, search for inventory via an interface, and view results of inventory searches. Inventory requests may be processed using local and remote data stores.

14 Claims, 22 Drawing Sheets

Setting a Supplier's Information

Creating a Category

ADD CATEGORY

Main Menu

Please enter the name of the category

Category name: Automobile

Category description: It's that thing you drive

Similar Names: car, truck, vehicle

Please enter other possible names for this category each separated by comma.
For example, other names for 'Automobile' can be 'Car, vehicle'.

[Submit Query]

FIG. 3c

Setting Parameter Metadata for the Category

| Name | Data Type Name | Description |
|---|---|---|
| Make | TEXT | Manufacturer |
| Model | TEXT | Camry, accord, mustang |
| year | NUMBER | year the car was manufactured |
| price | NUMBER | price |
| color | TEXT | exterior color |
| transmission | TEXT | automatic (yes/No) |
| convertible | BOOLEAN | - |
| interior color | TEXT | Color inside the car |
| Tyres width | NUMBER | tyre width |

ADD NEW

Name: [ ]
Units (If any): [ ]

Data Type:
- ○ BOOLEAN : Yes/No or true/false type of values
- ○ TEXT : Any kind of text value. Please use this for license, sku, vin, social security, etc, type of numbers.
- ○ NUMBER : Any kind of number. Make sure to add any neccessary units such as inches, lbs, dollars, etc.

Description: [ ]

[Submit]

FIG. 3e

Loading an Inventory Item (Data) to the System

| | | |
|---|---|---|
| web link | http://www.myautolink.com/bluemercedes.html | |
| color | Blue | exterior color |
| convertible | ○ don't care<br>○ yes<br>◉ no | |
| interior color | white | Color inside the car |
| Make | Mercedes | Manufacturer |
| Model | CLK-Class Cabriolet | Camry, accord, mustang |
| price<br>or set range<br>☐ Set Min Value<br>☐ Set Max Value | 71420.00 | price |
| transmission | | automatic (yes/No) |
| Tyres width<br>or set range<br>☐ Set Min Value<br>☐ Set Max Value | | tyre width |
| year<br>or set range<br>☐ Set Min Value<br>☐ Set Max Value | 2007 | year the car was manufactured |

Send

FIG. 3g

Entering Request Parameters

To get all the related items in the system leave all the fields empty and send the request.

[Send]

| | | |
|---|---|---|
| color | [          ] | exterior color |
| convertible | ⦿ don't care<br>○ yes<br>○ no | |
| interior color | [          ] | Color inside the car |
| Make | [Mercedes] | Manufacturer |
| Model | [CLK-Class Cabriolet] | Camry, accord, mustang |
| price<br>or set range<br>☐ Set Min Value<br>☑ Set Max Value | [          ]<br><br>[          ]<br>[72000] | price |
| transmission | [          ] | automatic (yes/No) |
| Tyres width<br>or set range<br>☐ Set Min Value<br>☐ Set Max Value | [          ]<br><br>[          ]<br>[          ] | tyre width |
| year<br>or set range<br>☐ Set Min Value<br>☐ Set Max Value | [          ]<br><br>[          ]<br>[          ] | year the car was manufactured |

FIG. 5c

FLEXIBLE REQUEST AND RESPONSE COMMUNICATIONS INTERFACES

CROSS REFERENCE TO RELATED APPLICATIONS

This application is a continuation and claims the priority benefit of U.S. patent application Ser. No. 11/833,867 filed Aug. 3, 2007, now U.S. Pat. No. 7,788,250 and entitled "Flexible Request and Response Communications Interfaces," which claims the priority benefit of U.S. provisional patent application No. 60/821,516 filed Aug. 4, 2006 and entitled "Flexible Request/Response Communications Interfaces." The disclosure of each of the aforementioned applications is incorporated by reference.

BACKGROUND

1. Field

This invention relates to storage of items in a database, and in particular to storage with user-defined item categories and parameters to allow for extensible customized searching and retrieval.

2. Related Art

The Internet is a vast pool of information and data that, when manageable, is a very useful resource. However, data accessible via the Internet is stored following different standards, file types and layouts, thus finding relevant data is often difficult.

In searching for data and information on the Internet or on any network, users have two choices: first, one may use a keyword search that matches the user provided search terms to the terms present in a document. For example, one may enter a set of laptop specifications, and results returned would hopefully include laptops for sale, but may also include reviews of laptops or forum posts looking for laptops with those specifications.

Alternatively, one may use a specially designed interface that searches a particular website or database or other resource for specialized information. For example, if one were to visit a laptop website and fill in fields for memory, size, weight and hard drive capacity, laptops fitting those criteria would be returned as results. However, such specialized interfaces are only available on specialized websites and for certain products.

Thus, in general the quality of search results is negatively proportional to the amount and variety of data that can be searched.

SUMMARY

Disclosed are methods and systems for database storage allowing subscriber entities to create custom, specialized interfaces for storing different classes of information based on subscribed-defined categories and parameters, allowing for efficient search and retrieval of the information by users using the subscriber-defined categories and parameters.

In one aspect, a method for defining an interface comprises sending an interface to a supplier for defining a new request type based on a set of attributes and a set of parameters, receiving from the supplier a set of attribute values for the set of attributes and a set of parameter names and parameter data type values for the set of parameters, creating a request type in a database based on the set of attribute values and associating the set of parameter names and parameter data types with the request type, receiving from the supplier a supplier link for communicating with the supplier, and associating the supplier link with the newly created request type, thereby allowing the database to be searched for the supplier according to the request type and the set of parameter names and parameter data types and allowing communication with the supplier via the supplier link for the request type.

In another aspect, a method for processing a search request comprises receiving from a user a set of search terms indicating a category and a set of parameter values associated with the category, retrieving from a database a request type satisfying the search terms wherein the request type indicates one or more supplier links, sending the search terms to one or more suppliers as indicated by the one or more supplier links, receiving a set of results from the one or more suppliers in response to the search terms, and sending the set of results to the user. Further aspects of the present invention are described herein.

BRIEF DESCRIPTION OF DRAWINGS

The drawings illustrate the design and utility of embodiments of the present invention, in which similar elements are referred to by common reference numerals. In order to better appreciate the advantages and objects of the embodiments of the present invention, reference should be made to the accompanying drawings that illustrate these embodiments. However, the drawings depict only some embodiments of the invention, and should not be taken as limiting its scope. With this caveat, embodiments of the invention will be described and explained with additional specificity and detail through the use of the accompanying drawings in which:

FIGS. 3a-3g show a series of screenshots illustrating an example process of adding an item to the system, in accordance with an embodiment of the present invention. As seen from FIGS. 3e and 3g a supplier can either set the system to send the request using the link set or the supplier can enter data at the system or both.

FIGS. 5a-5e show a series of screenshots illustrating an example process of searching the system, in accordance with an embodiment of the present invention.

DETAILED DESCRIPTION

In the following description, for purposes of explanation, numerous specific details are set forth in order to provide a thorough understanding of the invention. It will be apparent, however, to one skilled in the art that the invention can be practiced without these specific details.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Disclosed is a system for allowing the creation of user-defined request types and for allowing entities to communicate with the system using such request types. The system allows users to create specialized custom interfaces for different classes of information. The system utilizes a database to store information and respond to queries, and in particular allows searching based on subscriber-defined categories and parameters.

Figure 1:
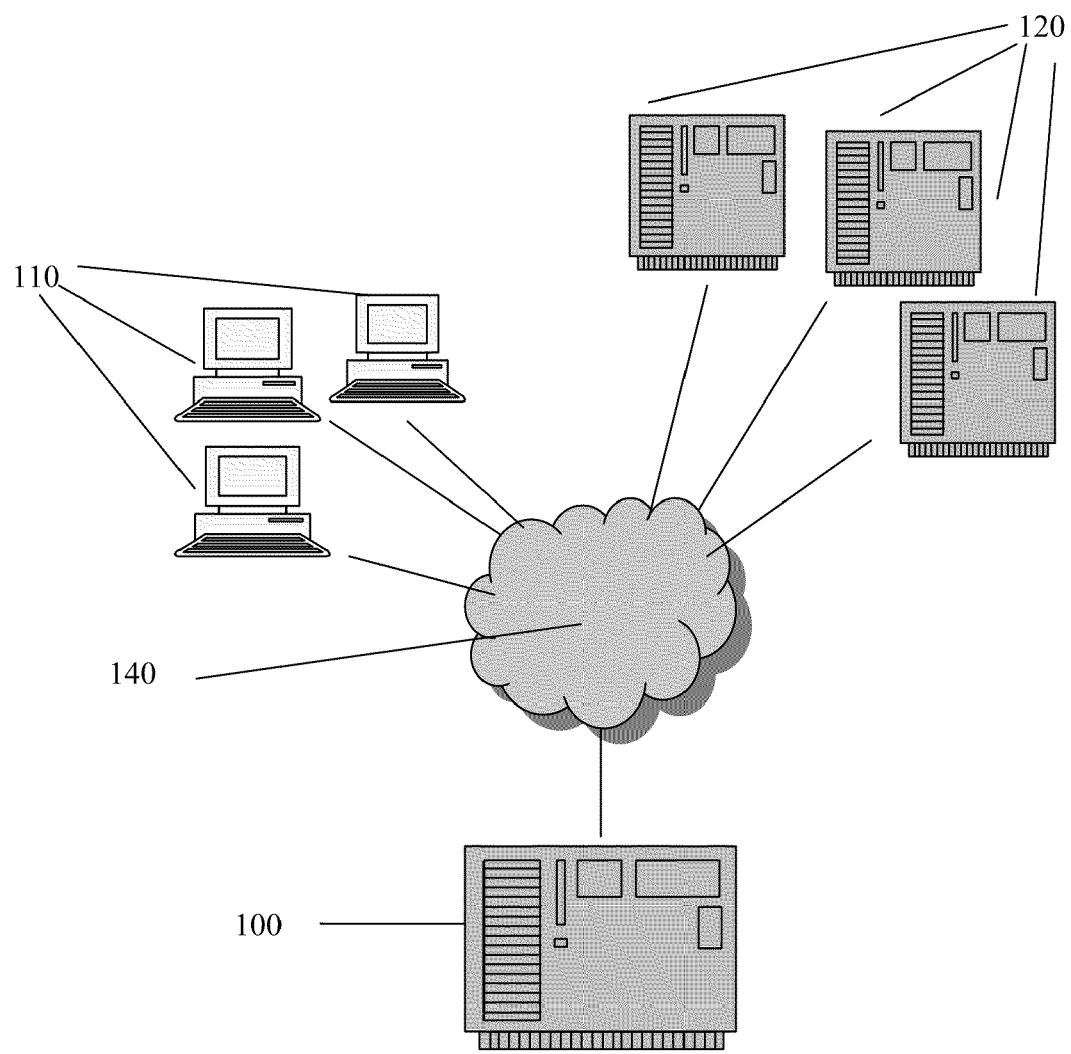
FIG. 1 is a block diagram illustrating a system for database storage with searchable user-defined categories and attributes, in accordance with an embodiment of the present invention.

FIG. 1 is a block diagram illustrating a system for allowing the creation of user-defined request types and for allowing entities to communicate with the system using such request types. System 100 is a computing system comprising a processor and memory, and communicates with a database for storage and retrieval of items.

One or more users 110 and subscribers 120 (hereafter also referred to as "suppliers") communicate with the system 100 (hereinafter also referred to as "host") via a network 140. A user 110 may or may not be a subscriber 120. Via an interface, the host 100 receives and responds to messages, hereinafter also known as "requests," from users 110 and subscribers 120. Request types and how the system 100 processes them are determined by the request's parameters, as described below.

A subscriber 120 interacts with a host 100 via an interface. The interface may be a website, an application programming interface (API), a program, or any other means by which a subscriber 120 may transmit data to and from the host over the network 140.

The system 100 allows subscribers 120 to add items to the system 100 for storage, and allows users 110 to interact with the system 100, for example to search the system for items of interest. A subscriber 120 may be a product vendor, service provider or anyone offering an item. As understood herein, an item may be a product, service, website, information source or anything else a supplier may provide.

The system 100 allows subscribers to define categories and parameters describing the item being listed. Optionally, supplier functions can be specified as well, indicating a relationship of the supplier to the item being listed. One advantage of allowing individual subscribers to define categories and associated parameters is the spreading of the effort of creating a large collection of categories and parameters for structuring the items stored in the system 100. Another advantage of having individual subscribers define and/or extend categories and associated parameters is that it eliminates or substantially reduces the need for a developer or designer to a priori generate a large number of different categories, as well as a large number of parameters for further describing the different categories, in order to structure or organize the items stored in the system 100.

For example, for a request type indicating a category "Automobile" and a supplier function "Seller," the request parameters may be "Make," "Model," "Year," "Color," and a response parameter may be "Price". However, for a category of "Automobile," and supplier function "Rental Service," the request parameters may be "From date," "To date," "Vehicle Class," and response parameters may include "Availability" and "Rate."

Figure 2:
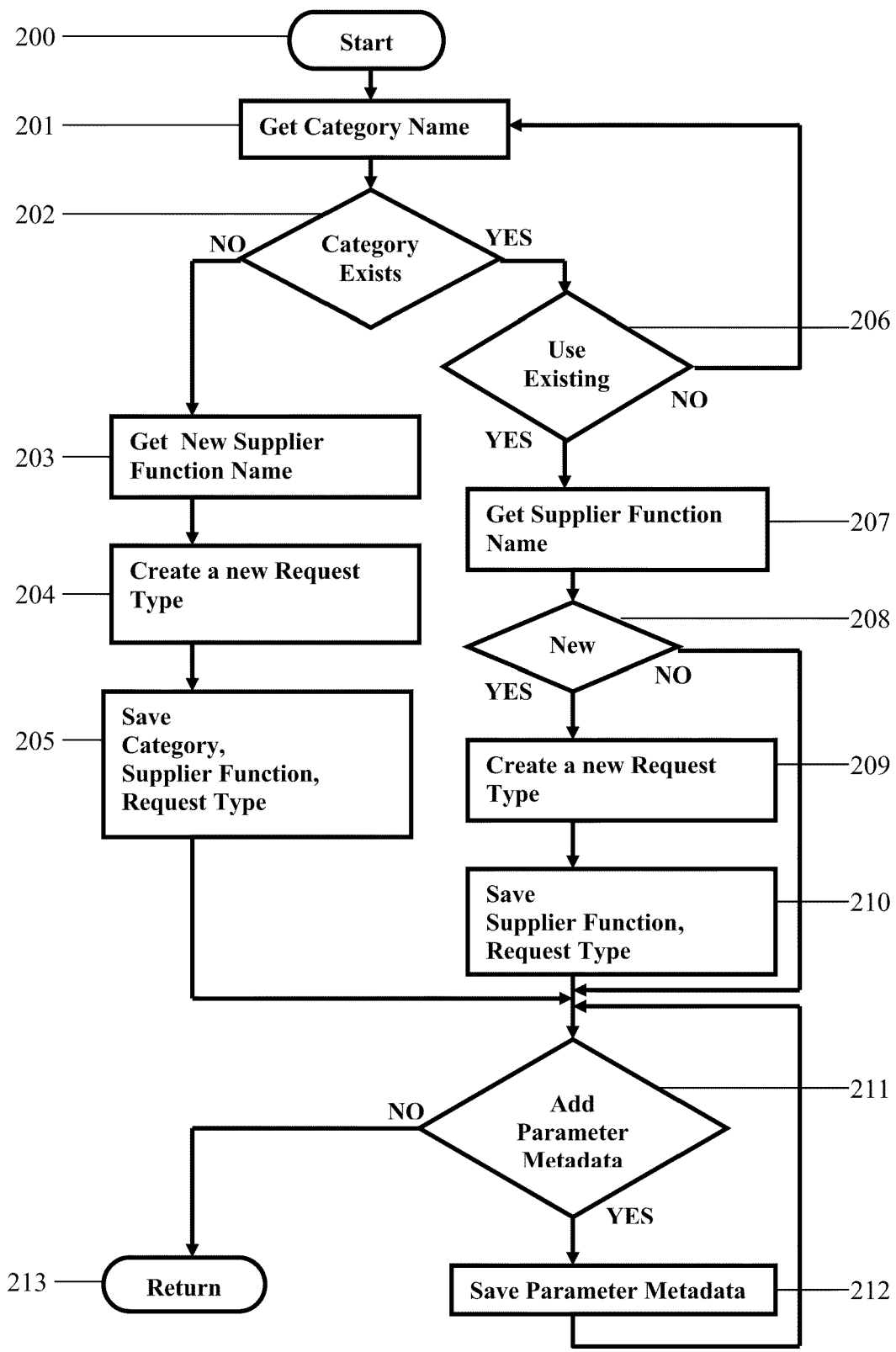
FIG. 2 is a flow chart illustrating a method for creating a new request type, in accordance with an embodiment of the present invention.

FIG. 2 is a flow chart illustrating a method for creating a new request type. In order to create a new request type, at step 201a supplier 120 first specifies a category. The interface for generating a new category may comprise a textbox or other element for receiving a new category name from the subscriber 120. At step 202, the system checks whether the category name specified by the supplier 120 already exists in the system. If the category name already exists, at step 206 the supplier 120 has the choice to enter another category name or use the existing one. The interface to choose an existing category may comprise a pull down menu, a field, a list or another method of specifying the preexisting categories from which the subscriber may choose.

At step 203 or 207, after specifying a category, the subscriber specifies a supplier function. A supplier function indicates a relationship between the item and the subscriber. Some examples of supplier functions for the category "Automobile" are "Seller," "Painter" and "Towing Service."

In one embodiment, the specified supplier function is preexisting. The interface may comprise a pull down menu, a field, a list or another method of specifying the preexisting supplier functions from which the subscriber may choose. In another embodiment the subscriber generates a new supplier function for the item to be listed under. The interface may provide a textbox or other methods of receiving a new supplier function from the subscriber.

At step 209, a new request type is created for the combination of the specified category and supplier function. At step 210, the request type is saved for subsequent reference.

After creating the request type, the supplier 120 specifies one or more parameters for the request type. Parameters are the attributes of the item being offered by the supplier, and are used to distinguish different items stored under the same request type. Parameters are defined by parameter metadata. A parameter metadata indicates one or more of a name, a display name, a data type, an owner type, a description for the parameter, or any other attribute.

In one embodiment, parameters are associated with specific request types and are not shared between different request types. For example, items under a request type given by a category "Shirts" and a supplier function "Seller", and items under a request type given by a category "Shoes" and a supplier function "Seller," may both have a parameter named "Size," but the parameters have their own sets of metadata. For example, for "Shirts" the "Size" parameter may be of data type "text" and take the possible values of "Small," "Medium" and "Large." On the other hand, for the category "Shoes," the "Size" parameter may be of a data type "Number" or "Integer" and take on possible values of 5, 5.5, 6, etc. Thus, while the two "Size" parameters may share a common name, the parameters are not shared between the request types and comprise different metadata.

A data type indicates the type of data that can be used for a given parameter. A data type can represent a single piece of data, such as a string, a number, a true or false value, or a collection of data values, such as an address with street, city, state, and postal code data.

Optionally, a data type may comprise a collection of data that can be extended or modified. For example, a list data type may comprise a list of text for available colors for an item. Suppliers can add to such lists so that other suppliers or users can subsequently choose from them. A data type may also support a range. For example, a number data type may indicate an exact value, a minimum value, and/or a maximum value. Similarly, a data type for date or time may indicate an exact value, or it may indicate a range of values given by a "From" value and a "To" value.

In an embodiment wherein the subscriber 120 specifies a preexisting request type, the system 100 presents a list of parameters associated with the request type (when such parameters are already associated). Optionally, at step 311 the supplier 120 may add one or more new parameters which will then be associated with this request type at step 312.

In another embodiment where the request type are not preexisting and are newly defined by a supplier 120, the supplier 120 defines a new set of one or more parameters to be associated with the request type.

A supplier 120 may subscribe to a request type by associating a link, hereinafter also referred to as a "supplier request link", with the request type. The supplier request link indicates where and how the supplier 120 wants requests for the request type to be sent to the supplier 120, as described in more detail below. This link may comprise a Uniform Resource Locator (URL), an email address, an address for receiving an API call, or other similar resource. The method of sending the request depends on the type of the supplier request link, as should be apparent to one of ordinary skill in the art. The system may then use the supplier request link to communicate with the supplier for the request type.

Optionally, a supplier request link indicates that some default information is stored on the system for a subscribed request type, thereby eliminating the need for a separate communication with the supplier 120. An example of such default information is a web link to the supplier's 120 web site, or the supplier's 120 contact information.

Another way a supplier 120 may subscribe to a request type is by adding one or more items for the request type to the system 100. FIGS. 3a-3g show a series of screenshots illustrating an example process of listing an item on system 100.

Figure 3A:
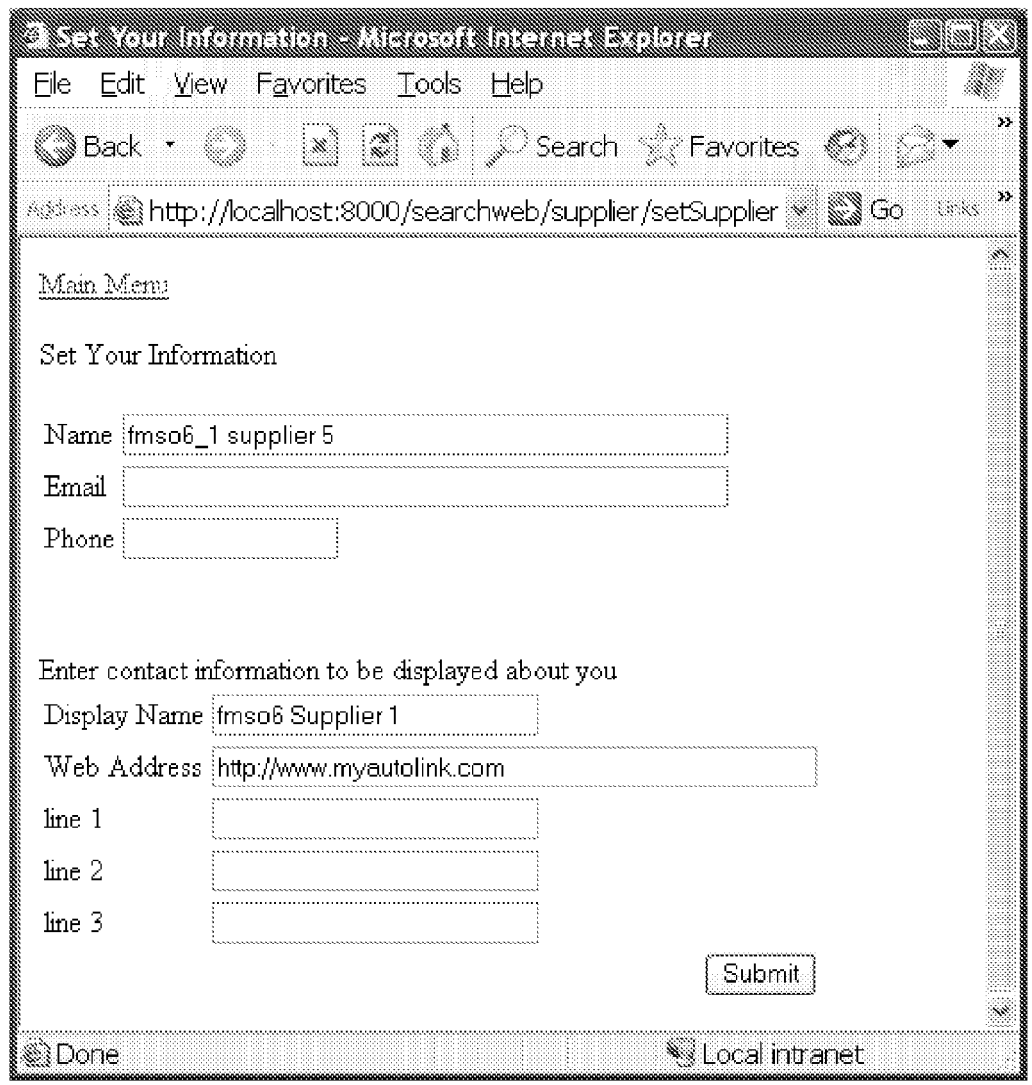
Figure 3B:
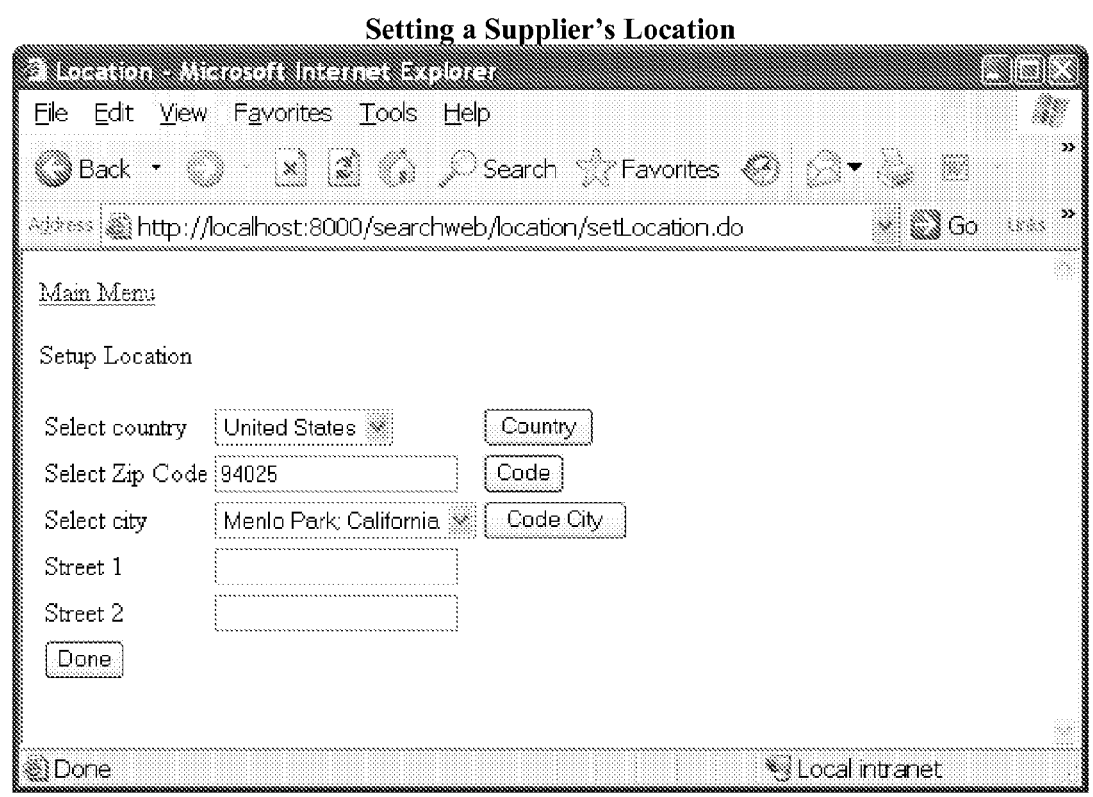
Figure 3D:
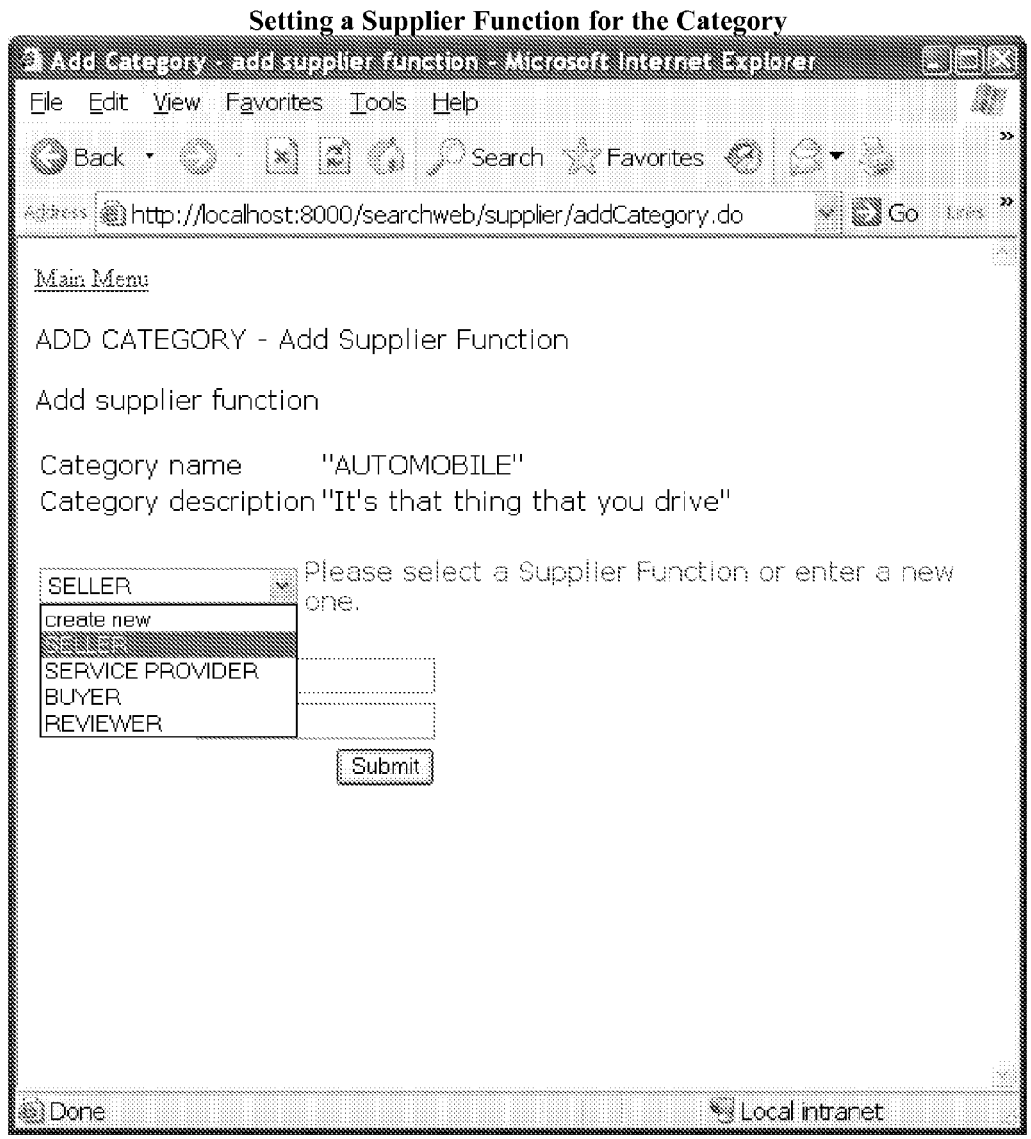

FIGS. 3a-3b, show the supplier 120 providing information describing the supplier 120. FIG. 3c shows the supplier creating a new category by providing a category name, a category description and an optional set of names indicating similar categories. For example, a supplier wants to list a blue Mercedes. In the example shown, the supplier provides the category name "Automobile." FIG. 3d shows the supplier choosing a supplier function, in this case a supplier function of "Seller." FIG. 3e shows the supplier adding one or more parameters to be associated with the request type given by the category and supplier function. The figure shows nine parameters already added, and more may be added depending on the supplier's 120 preference. As shown, the supplier 120 sets a "Name," "Data type," "Description," and optionally "Units" for the parameters.

Figure 3F:
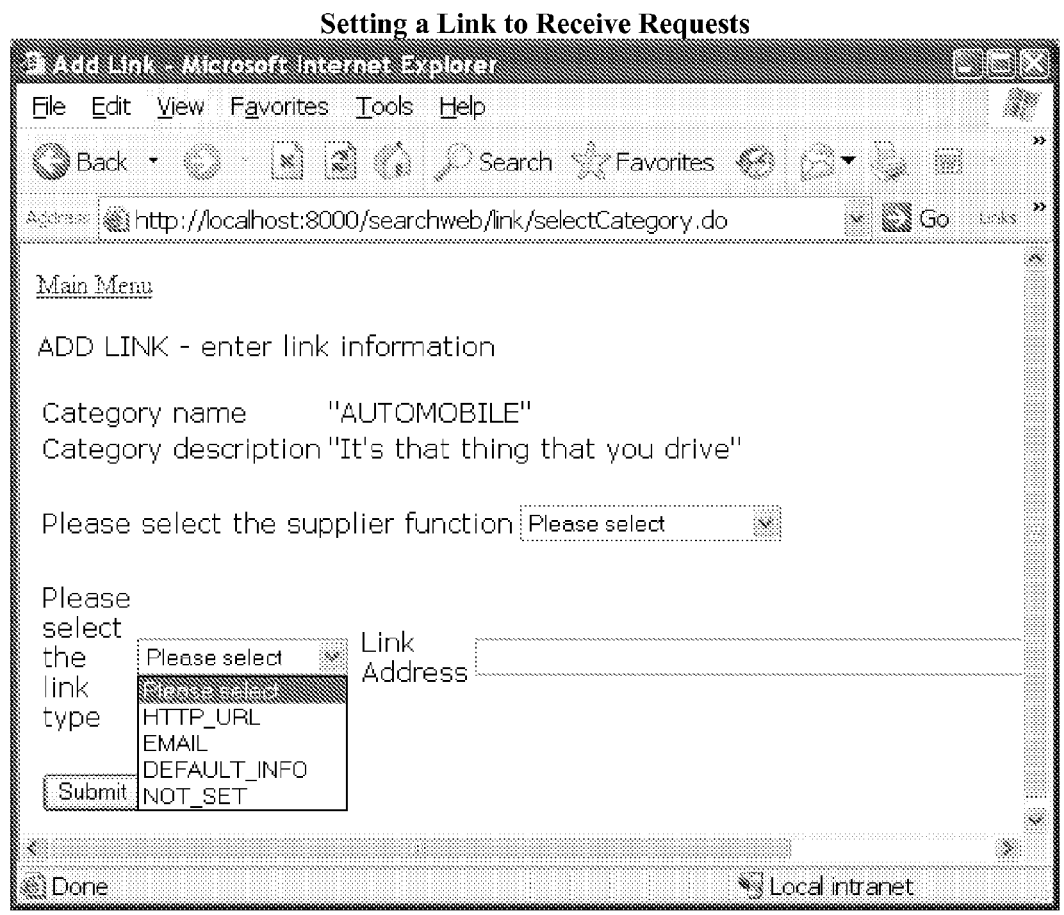

Starting with FIG. 3f, the supplier 120 defines data for a particular listing. First, the supplier 120 may provide a supplier request link for requests to be sent to, as described above. FIG. 3g shows the supplier providing values for one or more of the parameters associated with the request type given by the category and supplier function. In this particular example, the supplier has specified an item of category "Automobile," namely a blue Mercedes. Optionally the supplier may also provide a link (indicated in the "web link" text box at the top of FIG. 3g), as well as other support information such as part numbers, quantities, etc.

Similarly, if the supplier 120 is a dealership wishing to list an item indicating an "Oil Change" service on the system 100, the item may be listed under the category "Automobile," but with supplier function "Oil Change Service" and with such parameters as "Inspection Points," "Price," "Location," "Opening Times," etc.

In an optional embodiment, system 100 does not require the use of supplier functions. For example, a category name may implicitly indicate a supplier function. Examples of such categories include "Aircraft seller," "Automobile Repair," "Dog Groomer" and "Barber Shop." In such a case, the request type is the category without a supplier function.

The system 100 allows users to search the items added by subscribers 120. Upon a search request from a user 110, the system 100 responds with one or more results from suppliers 120 that match the criteria set by the user's 110 search.

Figure 4A:
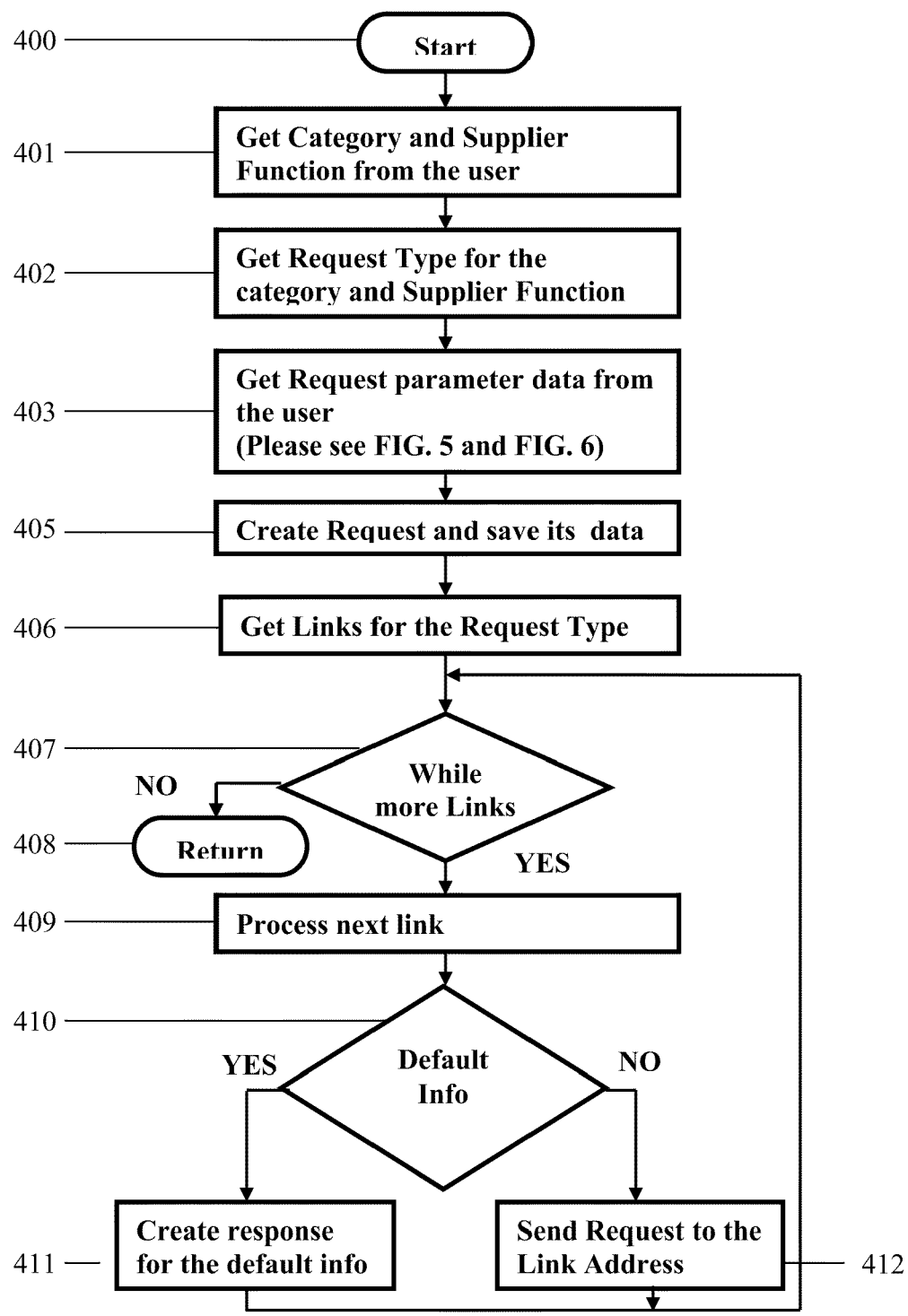
FIG. 4a is a flow chart illustrating a method for creating and sending out a request, in accordance with an embodiment of the present invention.

FIG. 4a is a flow diagram illustrating a method for creating and sending a search request. At step 401, the system 100 receives a category and a supplier functions from a user 110. At step 402, the system 100 finds the request type for the category and the supplier function. At step 403, the system 100 receives values for one or more of the parameters associated with that request type. Optionally, at step 405, the system 100 saves the request, along with associated data such as the request type, the parameter values, and the time the request was created, for later reference. At step 406, the system 100 retrieves the supplier request links associated with the request type. Steps 407-412 iterate over the set of retrieved supplier request links. For each subscriber request link, step 410 determines whether the system 100 needs to communicate with the corresponding supplier 120 or may instead create a response for the user 110 based on supplier's 120 default information stored on the system 100. In the first case, at step 412 the request is sent out to the corresponding supplier 120 indicated by the supplier request link, following the method indicated by the type of the link. The system 100 then receives the suppliers' 120 response and displays the response to the user 100. In the second case, at step 411 the system 100 generates a response for the user 100 based on the supplier's default information stored on the system 100.

Figure 4B:
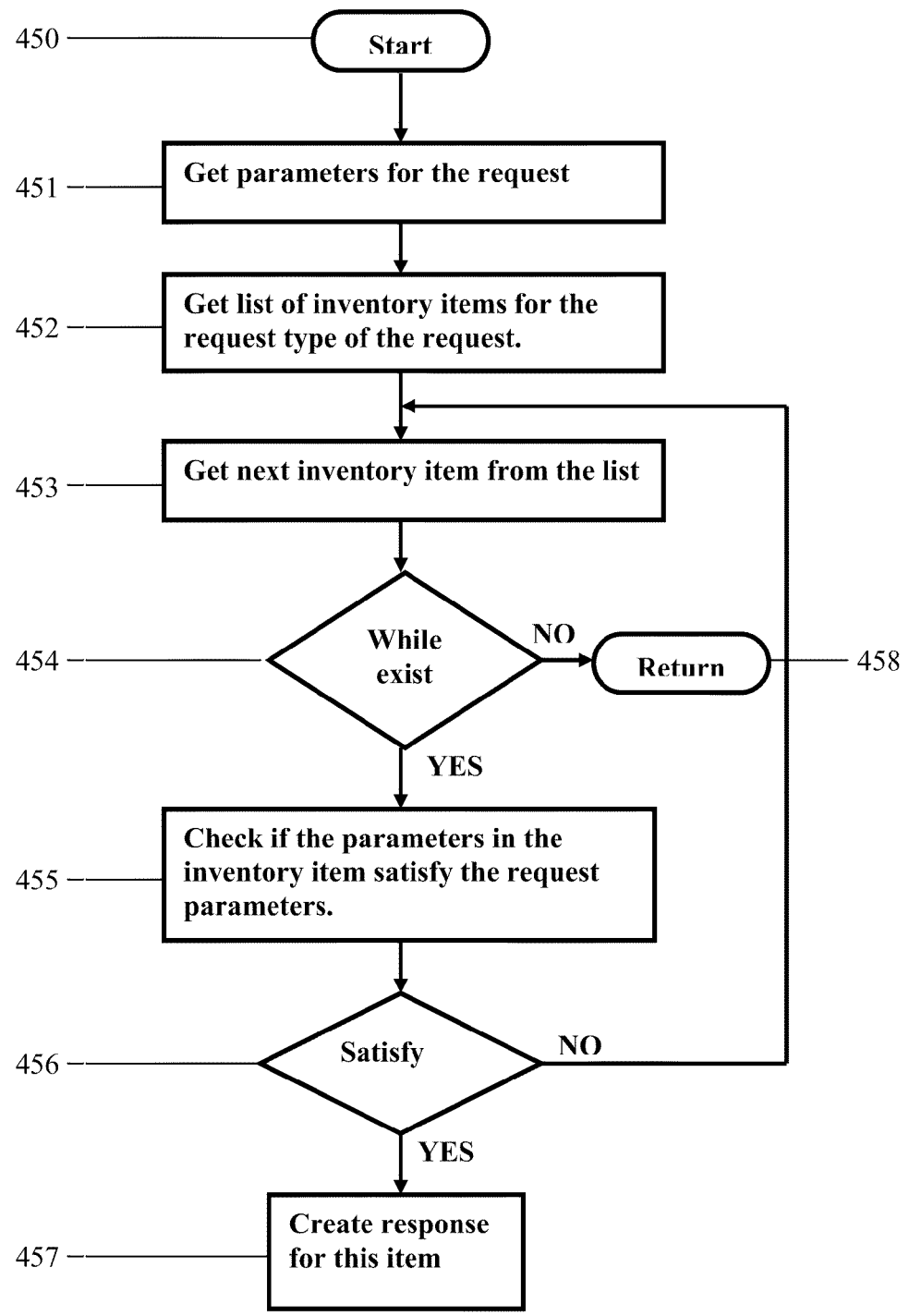
FIG. 4b is a flow chart illustrating a method for generating a search response based on data stored in the system, in accordance with an embodiment of the present invention.

In addition to providing supplier information as described in FIG. 4a, the system 100 also retrieves items stored in the system 100 which match the user's 110 search criteria. FIG. 4b is a flow chart illustrating a method for generating such a search response based on data stored in the system 100. At steps 451 and 452, the system 100 receives a set of parameters associated with a search request from a user 110 and retrieves a set of one or more items for the request type of the search request. Steps 453-456 iterate over the retrieved items, checking whether the item parameters satisfy the request's parameter values. For example, a request parameter with name "Length" and value "20" matches an inventory item with exactly the same parameter name and value, whereas a parameter value comprising a range matches an inventory item with a parameter value within that range. If the inventory parameters satisfy the request parameters, then step 457 creates a response to the user's search request. The system 100 then presents the response to the user, or saves the response for later presentation to the user.

Figure 5A:
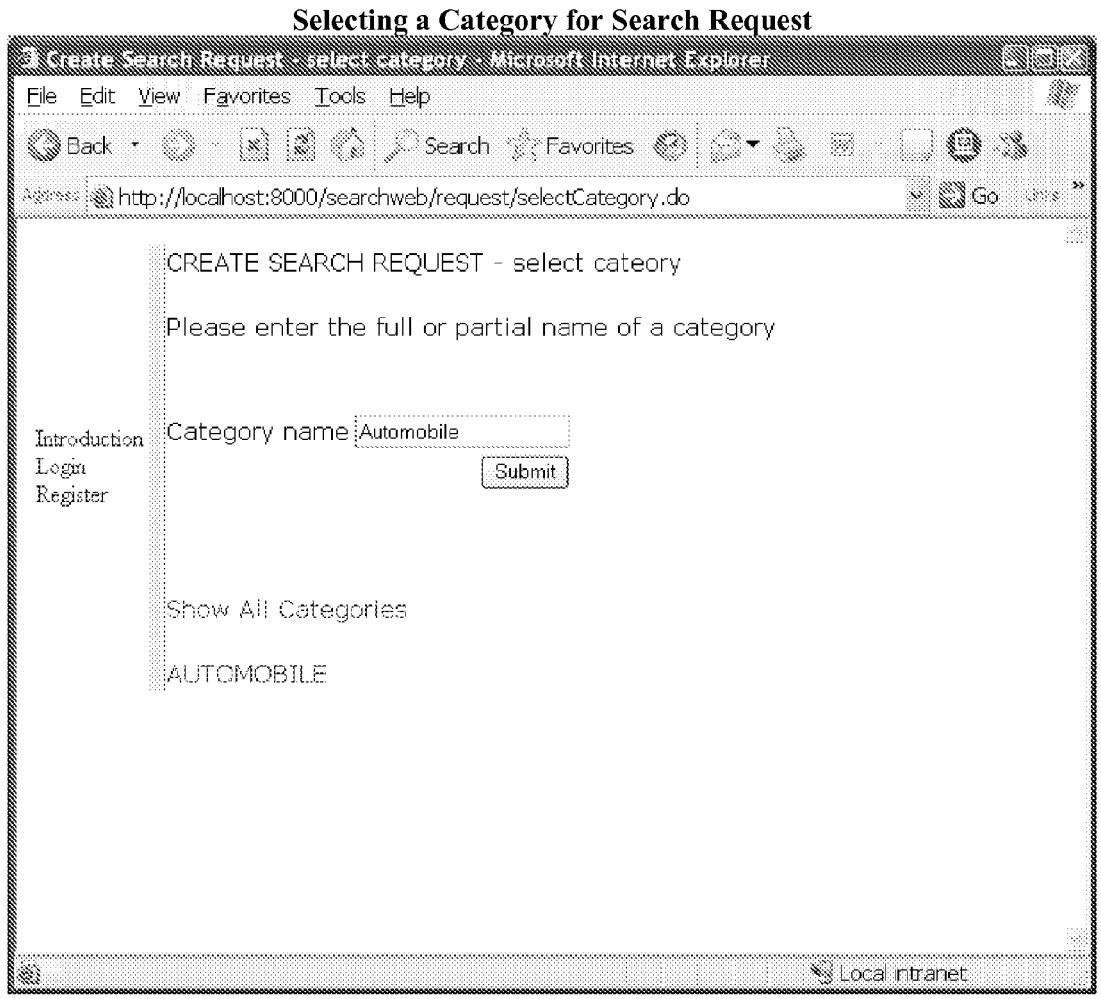
Figure 5B:
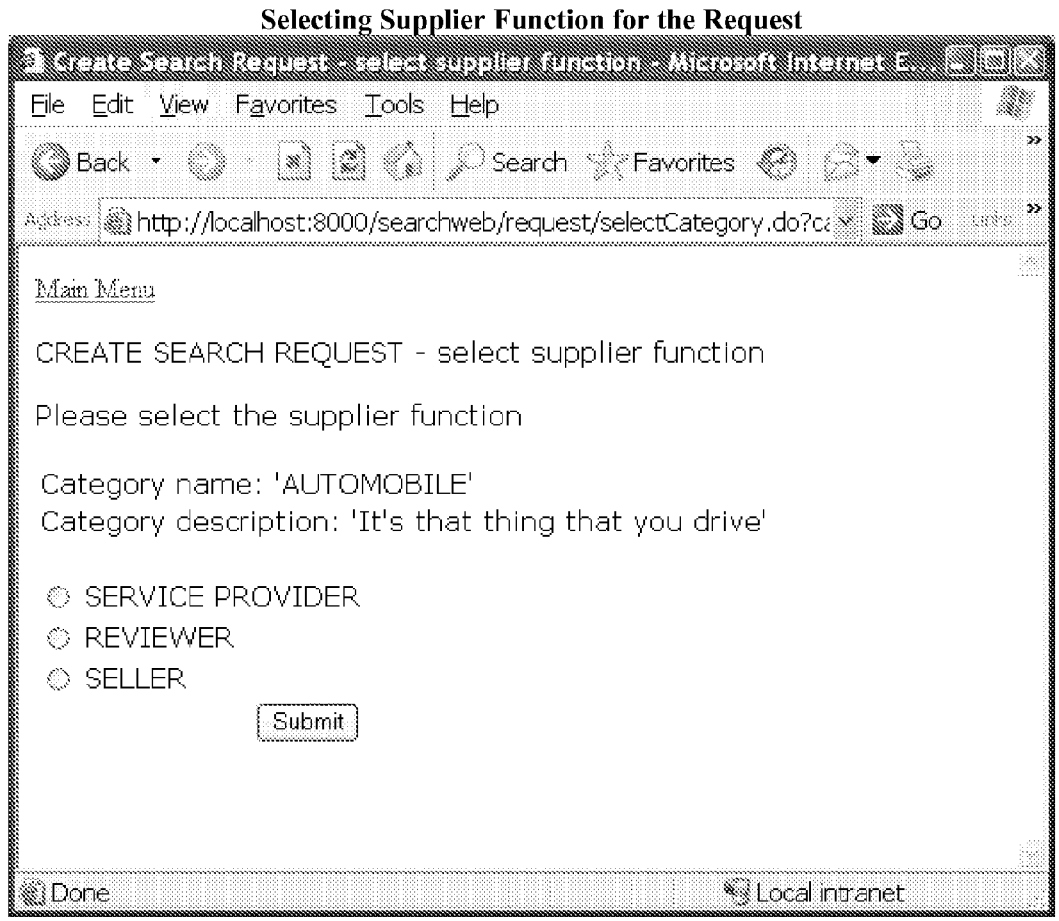
Figure 5D:
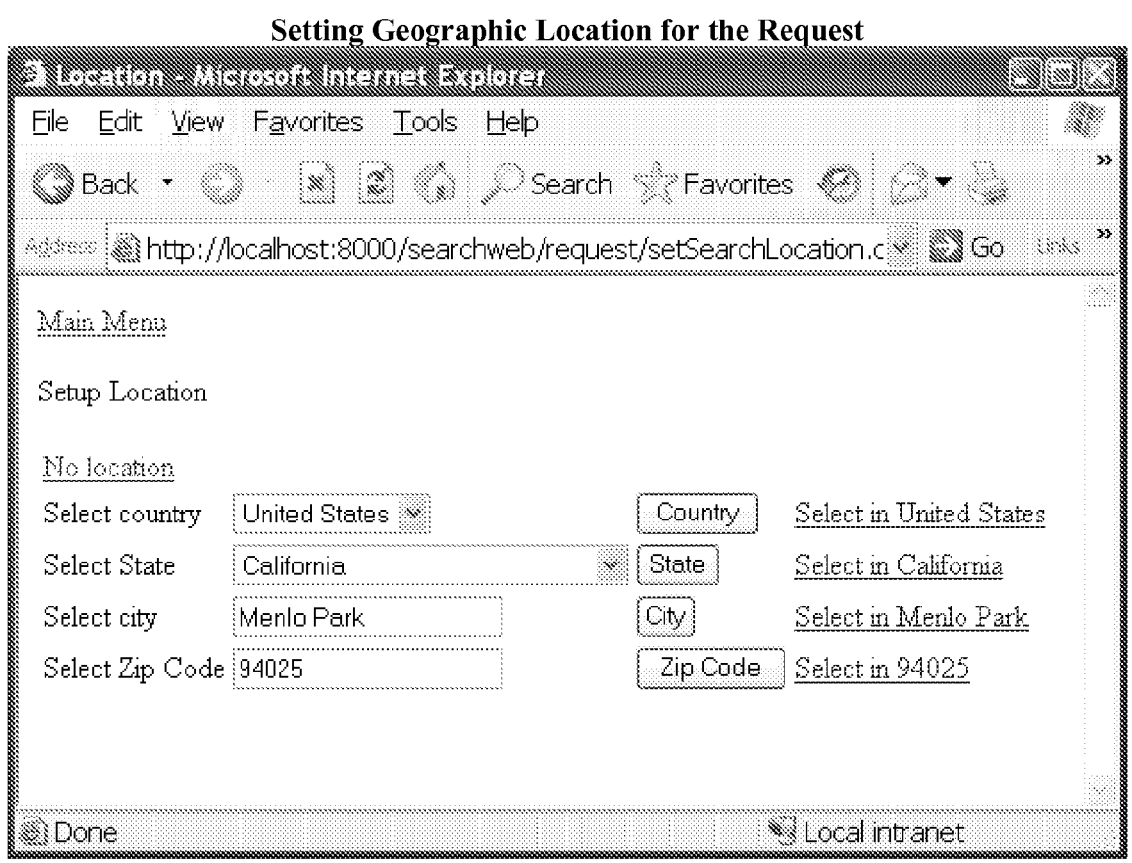
Figure 5E:
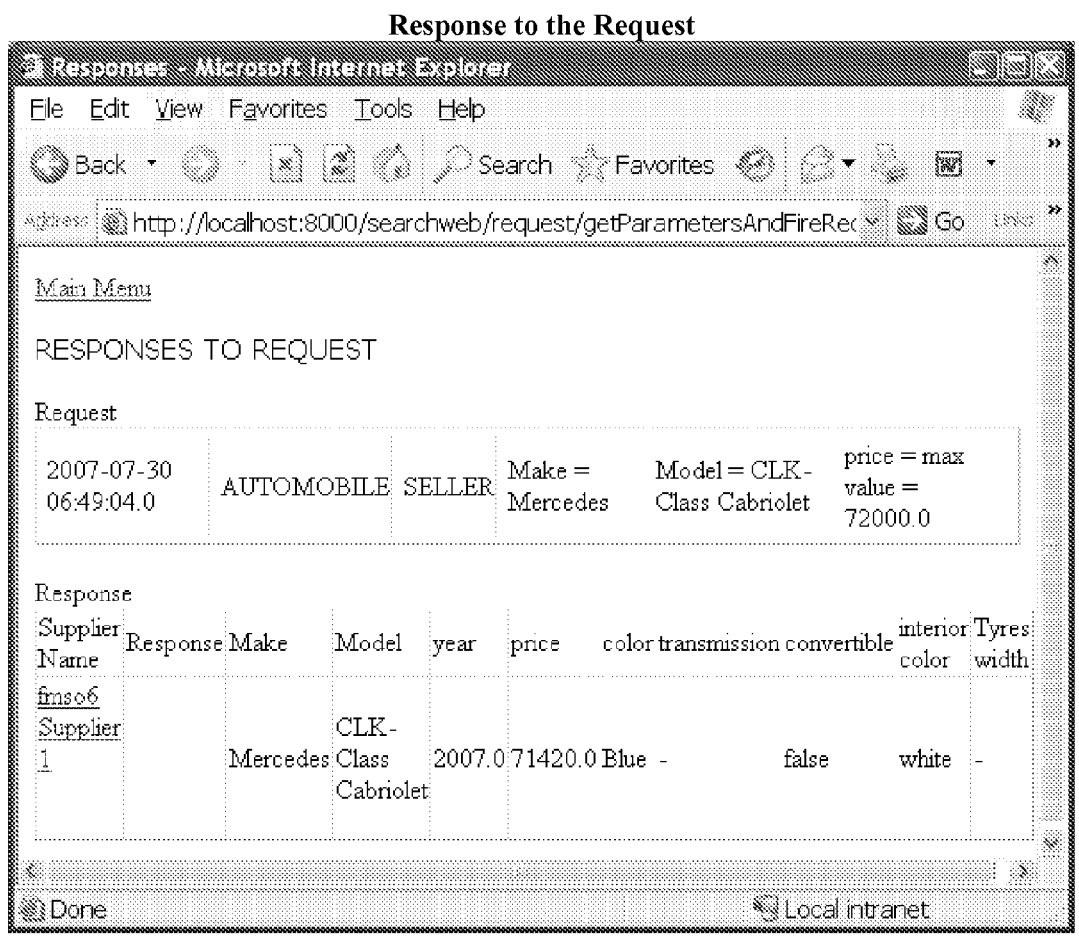

FIGS. 5a-5e show a series of screenshots illustrating an example process of searching the system 100. FIG. 5a shows a user 110 entering a keyword search to choose a category. FIG. 5b shows the user 110 choosing a supplier function from a set of available supplier functions for the chosen category. In this example, the user 110 has chosen "Seller" as a supplier function. In FIG. 5c, the user 110 is given a list of the parameters associated with the category and supplier function and fills in values for one or more of the parameters in order to further specify the search criteria. In the specific example shown in FIG. 5c, the user 110 does not care about the interior color of the car but specifies a maximum price for the car. FIG. 5d shows the user 110 entering location parameters to narrow search results based on geography. Lastly, FIG. 5e shows the system 100 displaying to the user 110 one or more resulting items that match the search parameter values provided by the user 110. Optionally, users 110 can also narrow search results to show items listed by one or more specific suppliers 120.

Suppliers 120 can send zero, one, or more than one response for a request. In one embodiment, the response comprises a web link to the supplier site that provides more information or provides an opportunity for the user to engage with the supplier for a purchase, for requesting more information, to sign up for a service, or to otherwise communicate with the supplier 120 about the results.

Optionally, a supplier 120 may partially meet the search criteria but still be allowed to send a response for the request. Suppliers 120 may use any of the request parameters in the response to determine whether they have items of relevance for the searcher. If a supplier does not have a relevant item, the supplier may still respond with items or information of potential interest and the system 100 may sort the responses by relevance for displaying to the searcher. Optionally, users are given an opportunity to indicate their preferences relating to result relevance and sorting.

For example, a user may submit a search with a value of "Red" assigned to a "Color" parameter. A supplier 120 with a matching result may return the result comprising "Red" as the "Color". Additionally, a supplier 120 with a result that matches the other parameters except with "White" assigned to the "Color" may still return that result, and the system 100 may assign a lower rank to the result in the sorting order for presentation to the user 110.

Optionally, a supplier 120 can control access to items which the supplier 120 has listed in the system 100. Thus, the supplier 120 can use the system 100 as a personal database, or allow access to specific users 110 or groups of users 110 (or the public), as specified by the supplier 120. Optionally, the system 100 may restrict particular searches to the items of a particular supplier 120. One particular use for this is to allow users visiting a supplier's 120 website to search that supplier's 120 items. The user 110 would be redirected to the system 120 where the user 110 will be restricted to the items for that particular supplier 120.

Figure 6:
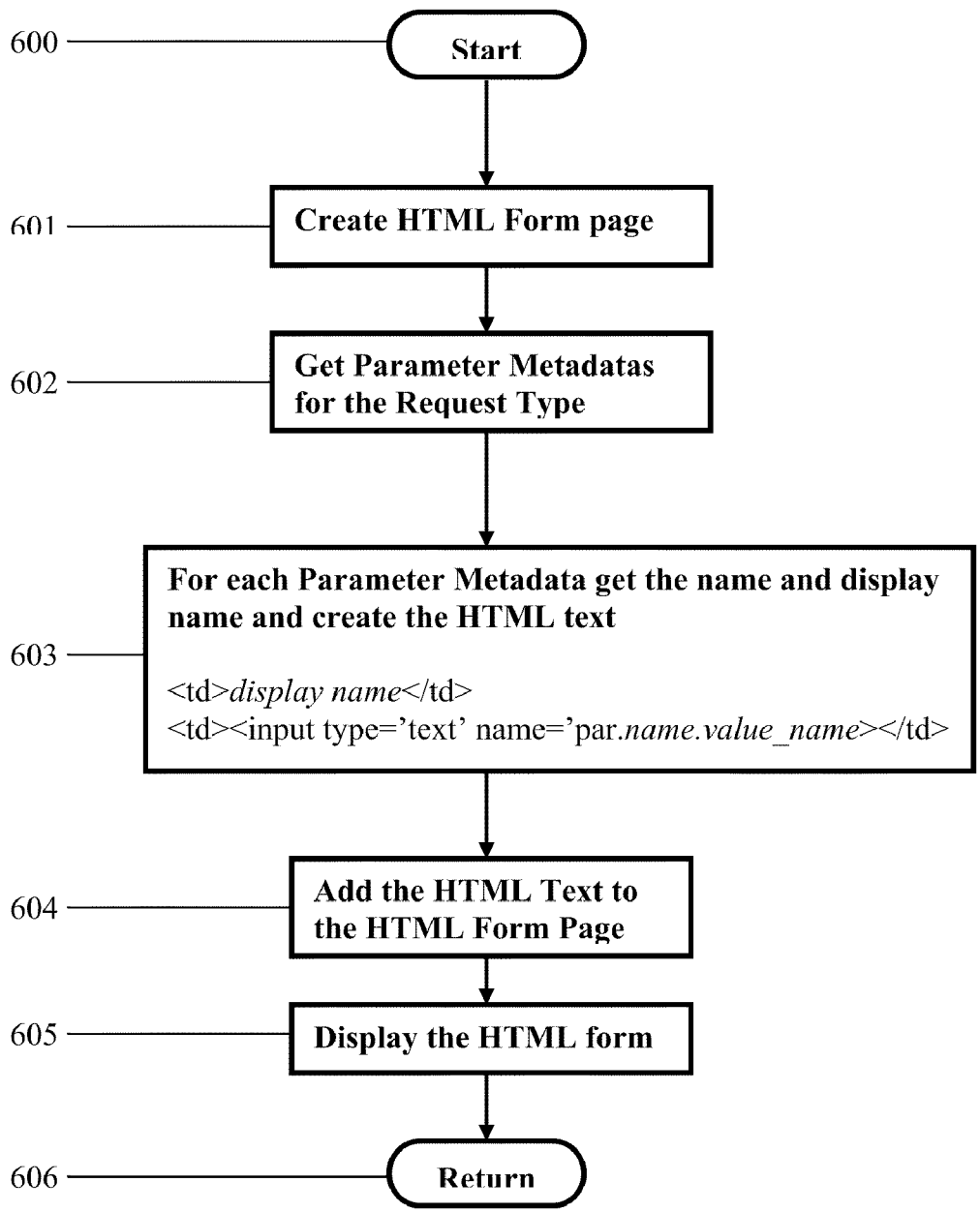
FIG. 6 is a flow chart illustrating a method for creating an HTML page (FIG. 5c) for a request, in accordance with an embodiment of the present invention.

FIG. 6 is a flow chart illustrating an example method for creating an HTML page for a request. At step 601, a Hypertext Markup Language (HTML) form page is created as an interface for the user 110. Alternatively, the interface may be implemented using a variety of different technologies including Flash, Java, Asynchronous JavaScript and XML (AJAX), or any other method of requesting data from a user.

At step 602, the metadata for the parameters associated with the request type are determined. At step 603, the metadata is used to determine the names and display names of the parameters and create HTML code for receiving input via the HTML form. In the particular code example shown in FIG. 6, the code comprises a display name and an input field of type text for a parameter.

An example naming format for the input field may be given by
par.name.value_name wherein name is the name of the parameter and value_name is the name of the data in the value. Examples of such names are
par.height.data, par.length.data, par.address.city, and par.address.state An example of the HTML code is

```
<td>display name</td>
<td><input type="text" name="par.name.value_name"></td>
    or
<td>Height</td><td><input type="text" name="par.height.data"></td>
<td>Length </td><td><input type="text" name="par.length.data"></td>
<td>City</td><td><input type="text" name="par.address.city"></td>
<td>State</td><td><input type="text" name="par.address.state"></td>
```

At step 604, the HTML code for the parameters is added to the HTML form page. At step 605, the HTML page is presented to the user 110 over the network. The request type is then saved as a session parameter or as a hidden field in the form.

Figure 7A:
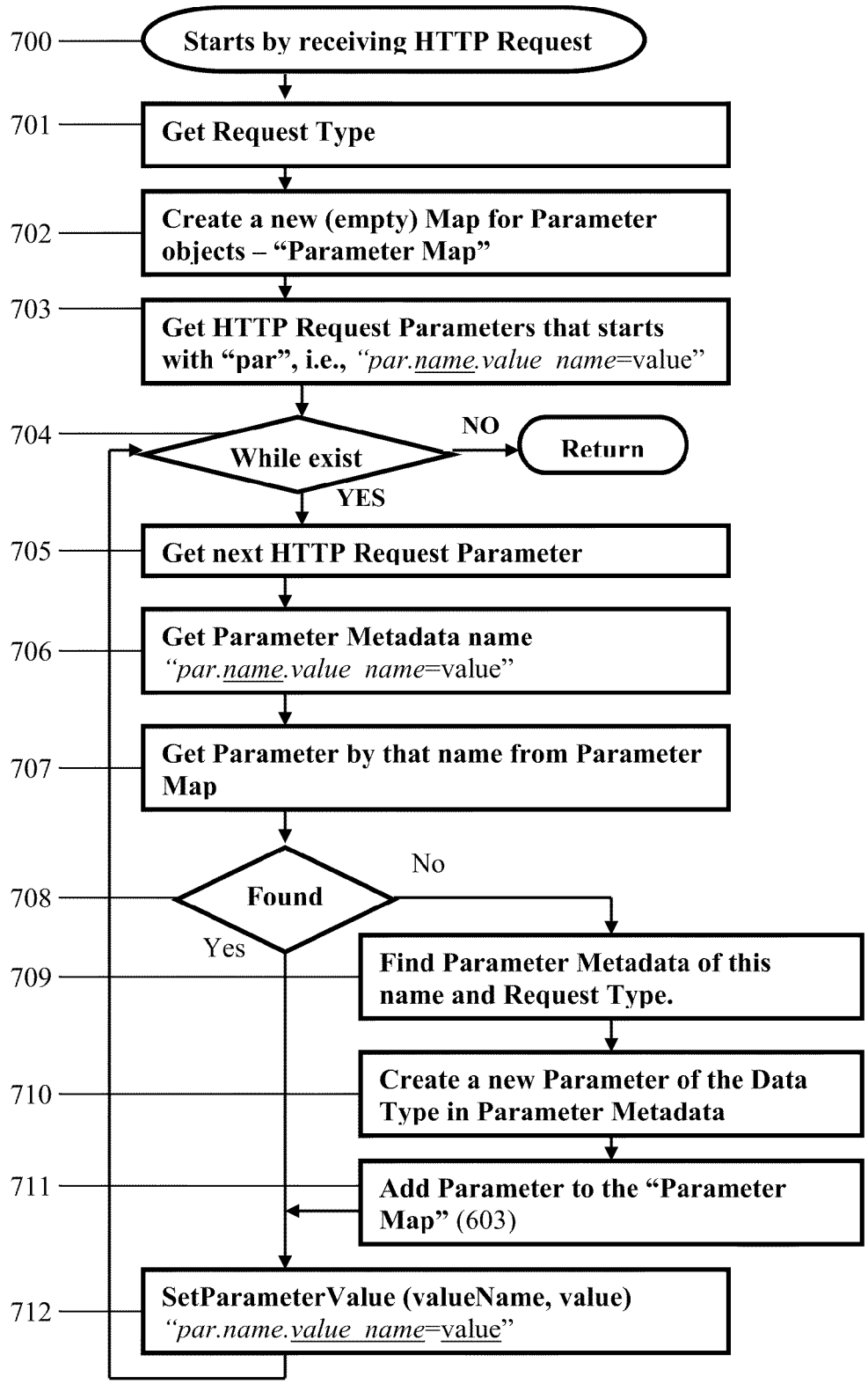
FIG. 7a is a flow chart illustrating a method for converting data received from an HTTP request to parameters, in accordance with an embodiment of the present invention.

FIG. 7a is a flow chart illustrating an example method for converting data received from an HTTP request to parameters. At step 701, the system 100 receives a request which has an associated request type. At step 702, a new empty map, such as a hash table or other lookup table or data structure, is created. This map is used to save the parameters that are created.

At step 703, the system 100 receives the HTTP request parameters, which in the example shown here begin with a prefix of "par." Steps 704-712 iterate over the HTTP request parameters. For each parameter, the system identifies the parameter name and determines whether a parameter with that name exists in the parameter map.

If a parameter with that name is not found, steps 709-712 determine a metadata according to the name and the request type, create a new parameter with the data type found in the metadata, add the newly created parameter to the parameter map, and assign the parameter value to the parameter. Alternatively, if a parameter with that name is found in the parameter map, steps 709-711 are skipped and the system assigns the parameter value at step 712.

Figure 7B:
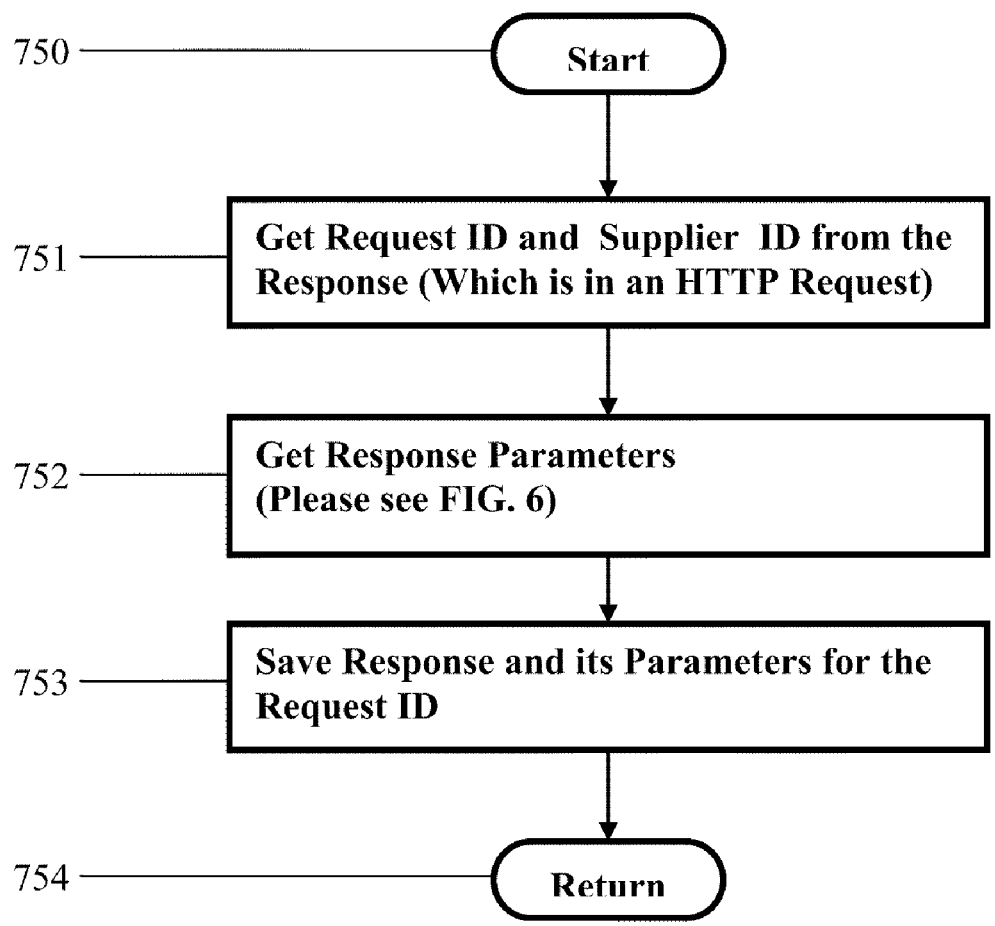
FIG. 7b is a flow chart illustrating a method for processing a supplier response, in accordance with an embodiment of the present invention.

FIG. 7b is a flow chart illustrating an example method for processing a supplier 120 response. At step 751, a request ID and supplier ID are obtained from a supplier 120 response. At step 752, the request ID is matched to a request type in the database in order to determine one or more associated response parameters. At step 753 and as discussed above, the response and its parameters are saved for the request ID or displayed to the user 110.

Figure 8:
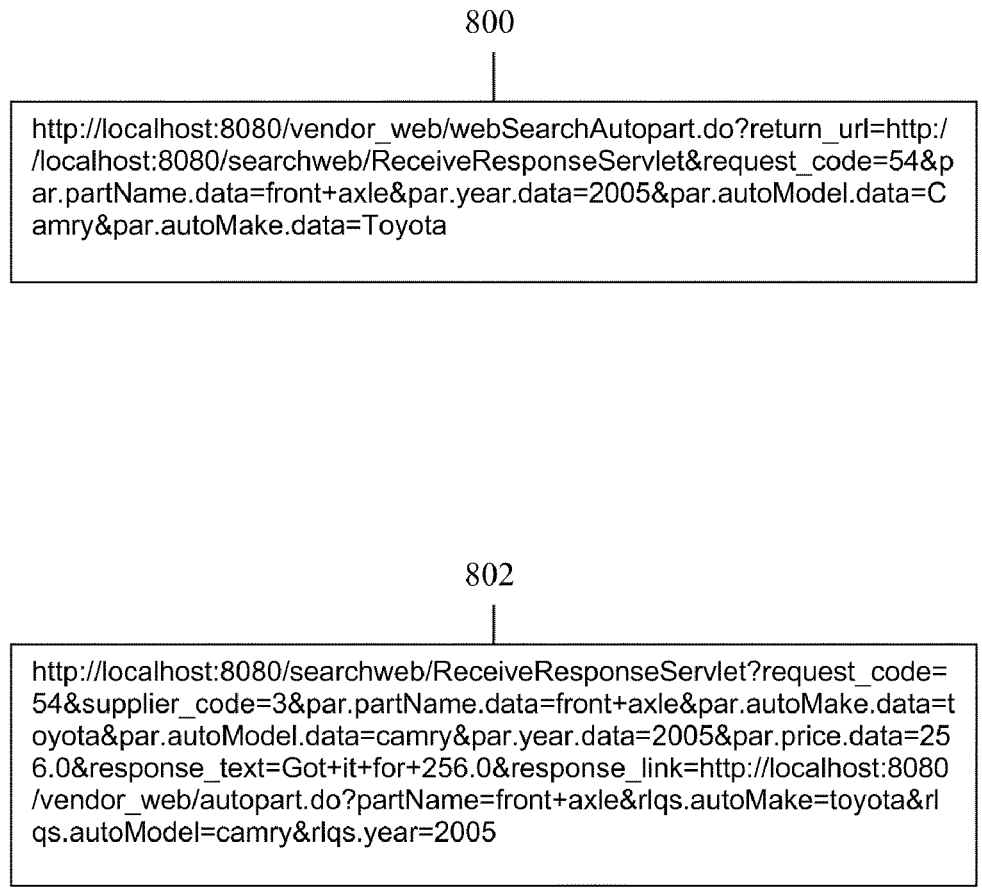
FIG. 8 shows an example HTTP request string for a message request to a member entity, and a response string, in accordance with an embodiment of the present invention.

FIG. 8 shows an example HTTP request string for a message request 800 to a member entity, as well as a response 902 to the request. In the message request 800, a user 110 is searching for an auto part, in particular a "Front Axle" of a 2005 Toyota Camry. In the response 802, the server has found a front axle of a 2005 Toyota Camry from supplier 3 for a price of $256.

Figure 9:
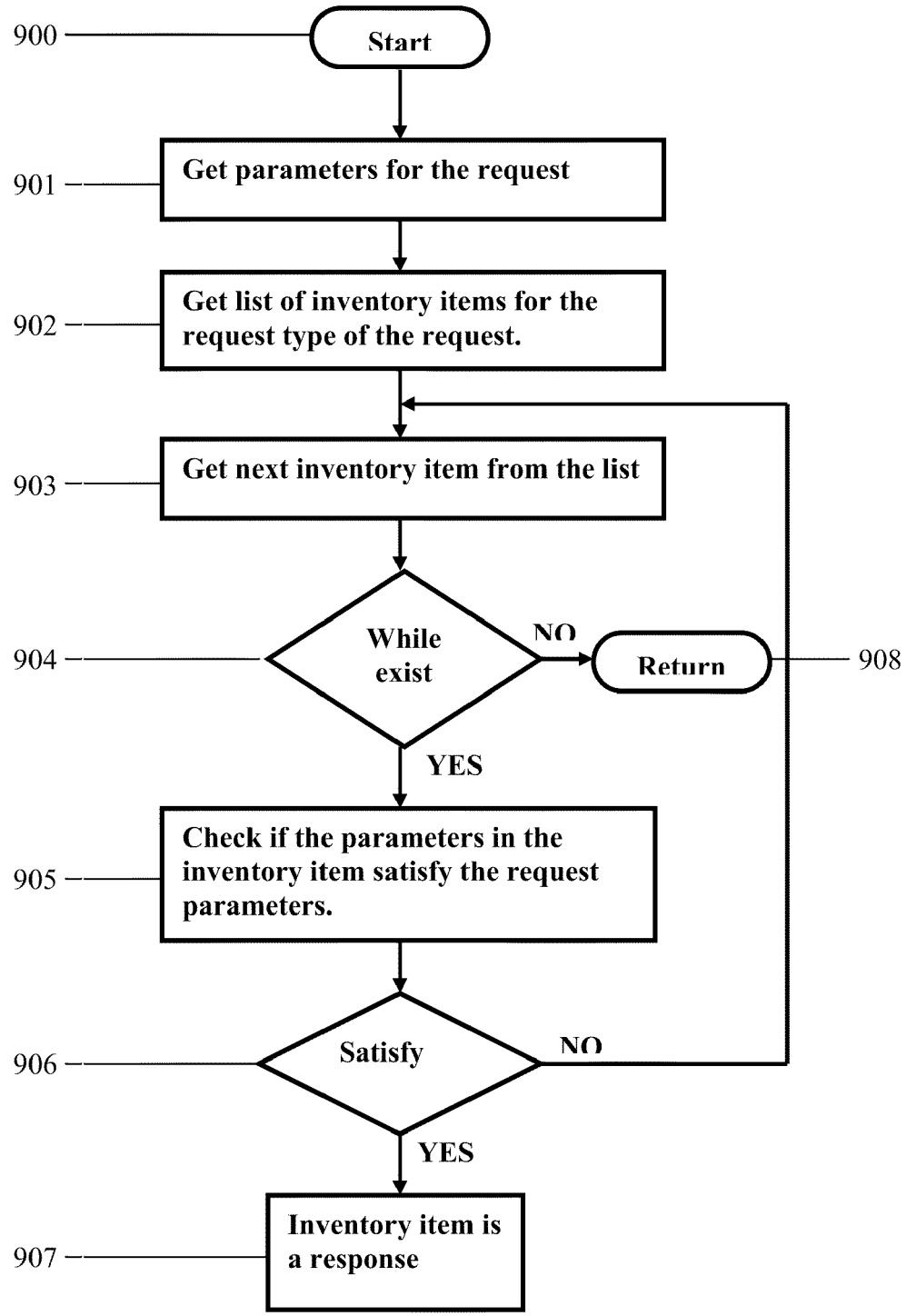
FIG. 9 is a flow chart illustrating a method for retrieving items stored in the system, in accordance with an embodiment of the present invention.

FIG. 9 is a flow chart illustrating a method for retrieving items stored in the system, in accordance with an embodiment of the present invention. At step 901, the system 100 determines a request type and parameters for the request. At step 902, a list of items stored on the system 100 is retrieved, wherein the list of items corresponds to the request type. At step 903-908 iterate over the retrieved items, creating a response at step 907 for each item that is determined at step 905 to satisfy the request parameters.

Figure 10:
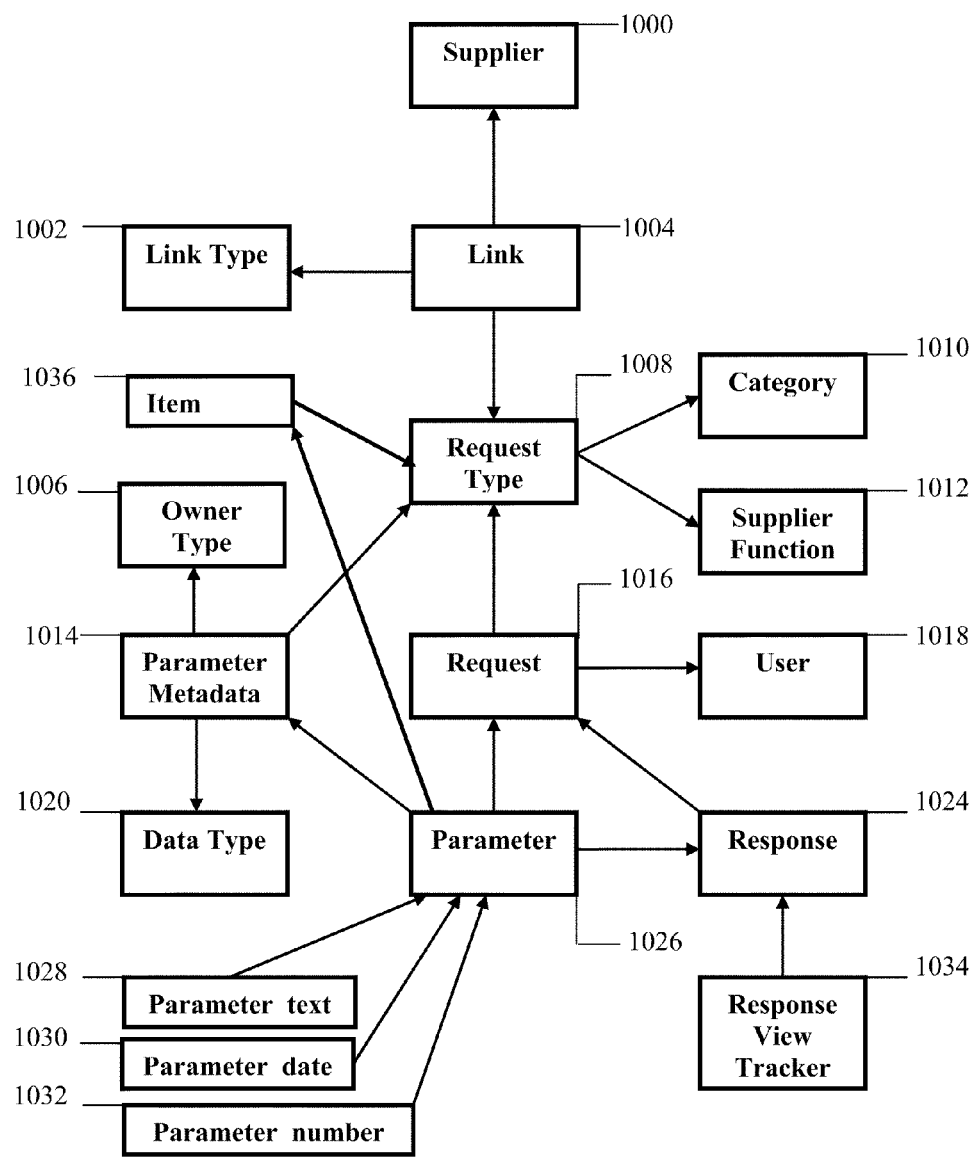
FIG. 10 is a representation of a database schema, in accordance with an embodiment of the present invention.

FIG. 10 shows an example representation of a database schema as used by an example embodiment of the system 100. The schema comprises a table 1000 for suppliers. A table 1008 for request types stores combinations of categories 1010 and supplier functions 1012 which suppliers may subscribe to.

A table 1004 for links comprises supplier request links for request types, as described above, wherein a link may be used for one or more request types. A request type may be associated with more than one link, depending on the number of suppliers 120 that have subscribed for that particular request type. An example of this is the case where a supplier 120 uses one link, such as a web address, for more than one request type.

A link type table 1002 defines the types of the links, such as email address, web addresses, API call addresses, links for default information, etc. A parameter metadata table 1014 associates parameters, stored in table 1022, with corresponding request types.

A parameter metadata comprises one or more data types stored in table 1020 and one or more owner types stored in table 1006. Parameters stored in table 1026 may be of data type "Text" (stored in table parameter_text 1028), data type "Date" (stored in table parameter_date 1030), data type "Number" (stored in table parameter_number 1032), or of other data types. Optionally, parameters may be collectively stored in table 1026 regardless of data type, with the parameter data stored in string format or in another universal format. Depending on the owner type 1006, a parameter belongs to a request 1016 or to a response 1024 or item 1036. Other owner types are possible and the system 100 is extensible to allow such extensions. Optionally, separate tables can be used for request, response and item parameters.

A user table 1018 stored entities that are allowed to send and receive messages to and from the system. A user may be an entity using the system 100 to search for items of interest, and may or may not be one of the entities that have subscribed to particular request types. Users in 1018 generate requests in 1016 for request types in 1008. A request may generate zero or more responses in 1024. As described above, a response may comprise a link that the user may use to get more information. An optional response view tracker in 1034 may keep track of when and/or how often a user clicks on such a link.

Optionally, responses may be presented to the user 110 in the order or priority decided by the user 110. In one embodiment, a temporary table in the database is created, using parameter names and metadata (obtained from the request type's response parameter metadata) for column definitions. For example, for metadata that has the name "Price" and data type "Number," a columns with the name "Price" and data type "Number" is created in the table.

In an alternate embodiment for data types that comprise collections of data, such as an address, an indirect data type such as "Distance" can be used as the response's data type. Alternatively, one of the data types and its name may be used as the collective data type for the column. For example, a zip code and/or city name data type may be used for a column.

The system 100 can present results in sorted order, based on database columns or parameter metadata. Responses may be generated in a desired ordering using a Structured Query Language (SQL) query with an "order-by" clause. This method can be used to order the responses for a plurality of metadata or columns, or to further filter the responses.

Optionally, categories may comprise a hierarchical structure, allowing suppliers 120 to create categories within categories and supplier functions.

Optionally, users may constrain search results to certain geographical regions such as nearby cities, states, countries, or regions, depending on user preference and search criteria.

In an optional embodiment, the system 100 provides suppliers 120 with visibility into searches that comprise parameters similar or related to items offered by the suppliers 120. Optionally, if a searcher is not anonymous, a supplier 120 may be provided an opportunity to provide a response to a request any time after the request has been sent out. For example, if a supplier 120 sees a search for an item which the supplier 120 may offer but has not listed on the system 100, the supplier may be provided an opportunity to provide a response to it.

Optionally, a request type may comprise one or more attributes other than category or supplier function. One example of such an alternative attribute is an "action request". An action request may indicate an action such as a "Bank Transfer" or a "Request for more information."

Optionally, the system 100 may send a request of a given request type to a subset of the suppliers subscribed to the request type based on user preferences persistently stored in the user's account of specified at the time of the request.

In an optional embodiment, the system 100 provides other request types such as "Bank Transfer," or any other operation that may take place between two parties and may be facilitated by the system 100 as a request type.

Optionally, the system 100 provides a facility for ad targeting. A marketer may generate one or more relevant ads to a user at the time of the search request. The system 100 may generate or provide the ad itself, or coordinate with a third party who generates or provides the ad. The third party may be implemented by an automated ad generation engine, such as a "Sponsored Search" ad generation service (such as Google™ AdWords™) or a "Contextual Advertisement" ad generation service (such as Google™ AdSense™). The ad engine or the third party may generate an ad based on the request and its parameters, and send the ad to the system 100 for displaying to the searcher.

Optionally, some or all suppliers 120 have their data or services hosted by the system 100. In such an embodiment, the messages are generated by the system 100.

Optionally, requests and their responses may be saved in user accounts. Optionally, information about when a web link in a response is clicked is saved for billing purposes. The system may also help in avoiding or reducing click fraud.

Optionally, the system 100 may verify the quality and/or identity of the suppliers 120 using the system 100 using one or more options. One example comprises verifying that phone numbers and addresses are not reused when a supplier's 120 account is suspended. This can be done by having the supplier 120 send a text message or voice mail message to the phone number provided by the user. In another embodiment, credit card numbers are verified. Alternatively, security certificates may be used by one or more of the suppliers 120. Responses can be prioritized or filtered, based on the presence of certificates, based on the particular parameters of the certificates, based on credit card verification, or based on other information provided by suppliers 120.

While certain exemplary embodiments have been described and shown in the accompanying drawings, it is to be understood that such embodiments are merely illustrative and not restrictive of the broad invention and that this invention is not limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principals of the present disclosure or the scope of the accompanying claims.

What is claimed is:

1. A method for providing access to a database using a custom interface, the method comprising:
providing a first interface to a remote first supplier over a network, the first interface allowing the first supplier to define a customized second interface based on a particular set of products or services offered by the first supplier, the first interface associated with a first data record format, the customized second interface associated with a second data record format, the first data record format comprising a subset of the second data record format;
receiving from the first supplier (a) a product or service category and (b) a set of parameter definitions comprising parameter names and parameter data types, wherein the product or service category and the parameter definitions describe the particular set of products or services offered by the first supplier;
creating a new request type in a database based on the product or service category, and associating the set of parameter names and parameter data types with the new request type, wherein the customized second interface is defined by the first supplier and based on the new request type;
receiving a first inventory data plan item associated with a first inventory through a second interface generated based on the new request type, the first inventory data item having data values for the set of attributes and the set of parameters;
storing the first inventory data item to a data store;
receiving an inventory request through the second interface, the request having attributes and a set of parameters and associated with a desired inventory;
comparing the inventory request to inventory data stored in the data store, the inventory including the first inventory data;
presenting the customized second interface defined by the first supplier to one or more other remote suppliers to allow the one or more remote suppliers to extend the customized second interface by (c) adding further parameter definitions to further describe one or more other products or services offered by the one or more other suppliers, the products and services offered by the first supplier in about the same product or service category as the products or services offered by the second supplier, and (d) adding one or more supplier links of the one or more other suppliers;
receiving a from a user, the request associated with items of interest among the products or services offered by the suppliers using the extended customized second interface, and allowing user requests for items of interest to be sent to the suppliers via the supplier links; and
displaying the extended customized second interface to the user.

2. The method of claim 1, wherein the data store is locally accessed.

3. The method of claim 1, wherein the data store is accessed over a network.

4. The method of claim 1, wherein the set of parameters comprises a supplier function parameter describing a relationship of the first supplier to the product or service category.

5. The method of claim 1, further comprising combining a supplier links and the parameter names in order to obtain universal resource locators for sending the user requests to the suppliers.

6. The method of claim 4, further comprising:
retrieving from the data store one or more inventory items satisfying the inventory request; and
sending the retrieved one or more inventory items to a user.

7. The method of claim 6, further comprising:
filtering one or more inventory items based on one or more geographical locations.

8. A system for defining an interface, comprising:
a server having a processor and memory, the server configured to execute instructions stored in the memory to provide a first interface to a remote first supplier over a network, the first interface allowing the first supplier to define a customized second interface based on a particular set of products or services offered by the first supplier, the first interface associated with a first data record format, the customized second interface associated with a second data record format, the first data record format comprising a subset of the second data record format, receive from the first supplier (a) a product or service category and (b) a set of parameter definitions comprising parameter names and parameter data types, wherein the product or service category and the parameter definitions describe the particular set of products or services offered by the first supplier, create a new request type in a database based on the product or service category, and associating the set of parameter names and parameter data types with the new request type, wherein the customized second interface is defined by the first supplier and based on the new request type, receive from the supplier a supplier link for communicating with the supplier, associate the supplier link with the newly created request type, receive a first inventory data item associated with a first inventory through a second interface generated based on the new request type, the first inventory data having data values for the set of attributes and the set of parameters, store the first inventory data item to a data store, receive an inventory request through the second interface, the request having attributes and a set of parameters and associated with a desired inventory;
compare the inventory request to inventory data stored in the data store, the inventory including the first inventory data;
presenting the customized second interface defined by the first supplier to one or more other remote suppliers to allow the one or more remote suppliers to extend the customized second interface by (c) adding further parameter definitions to further describe one or more other products or services offered by the one or more other suppliers, the products and services offered by the first supplier in about the same product or service category as the products or services offered by the second supplier, and (d) adding one or more supplier links of the one or more other suppliers;
receiving a from a user, the request associated with items of interest among the products or services offered by the suppliers using the extended customized second interface, and allowing user requests for items of interest to be sent to the suppliers via the supplier links; and
displaying the extended customized second interface to the user.

9. The system of claim 8, wherein the data store is locally accessed.

10. The system of claim 8, wherein the data store is accessed over a network.

11. The system of claim 8, wherein the set of parameters comprises a supplier function parameter describing a relationship of the first supplier to the product or service category.

12. The system of claim 8, further comprising combining a supplier links and the parameter names in order to obtain universal resource locators for sending the user requests to the suppliers.

13. The system of claim 11, further comprising:
retrieving from the data store one or more inventory items satisfying the inventory request; and
sending the retrieved one or more inventory items to a user.

14. The system of claim 13, further comprising:
filtering one or more inventory items based on one or more geographical locations.

* * * * *